Oct. 11, 1966 J. T. SCULLY 3,278,200

CHECK BOOKS

Filed Aug. 26, 1963

2 Sheets-Sheet 1

INVENTOR:

John T. Scully

INVENTOR:
John T. Scully 3,278,200
CHECK BOOKS

John T. Scully, 235 W. 76th St., New York 23, N.Y.

Filed Aug. 26, 1963, Ser. No. 304,380
2 Claims. (Cl. 282—8)

Figure 1:
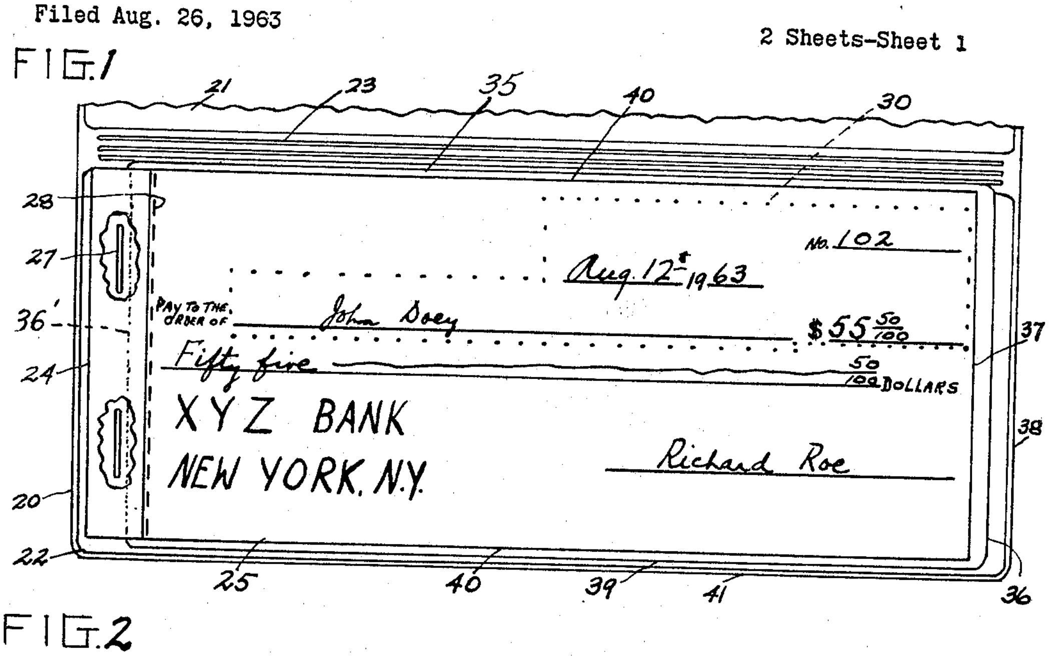

This invention relates to check books generally and more particularly to check books of the kind in which matter written on the check blanks will be simultaneously duplicated on the stub blanks.

Reference is made in this application to my co-pending application for Check Books, Serial No. 160,401, filed Dec. 12, 1961, issued Sept. 1, 1964 as United States Patent No. 3,147,028.

Among the principal objects of this invention are: the provision of improved means for preventing the appearance of impressions, such as identations, and or writing on check blanks underneath the check blank being written upon; to provide impression-preventive means which will combinedly serve as stub blank lifter to facilitate and quicken the locating of the succeeding check blank to be written upon and the folding over of the used stub blanks from the succeeding check blank to expose the latter; to provide the impression-preventive means in a form easily located between leaves of the book and easily handled for insertion therebetween and removal to a changed position and in a durable, lightweight, cheap form which, if the need ever be, can most easily and rapidly be cleaned and which will provide an extremely smooth surface and serve as a writing board and which may, if desired, carry printed matter beneath a protective coating which is transparent; to provide a generally improved check book; and to provide a generally improved check book of the kind wherein matter written on a check blank will be simultaneously duplicated on a stub blank.

The above and other objects will become apparent from the description taken in connection with the accompanying drawing in which similar reference numerals or characters refer to similar or corresponding parts throughout the several views.

Figures 2, 3, 4:
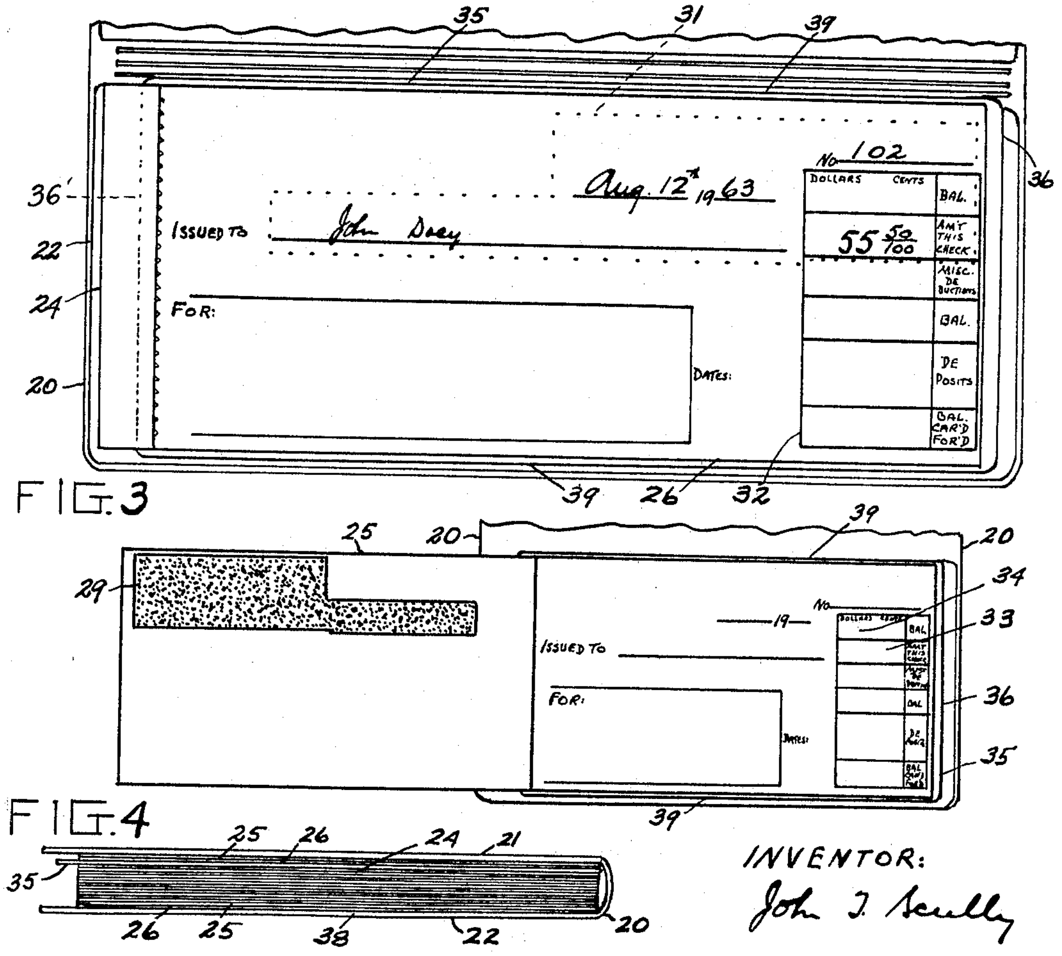
Figures 5, 6:
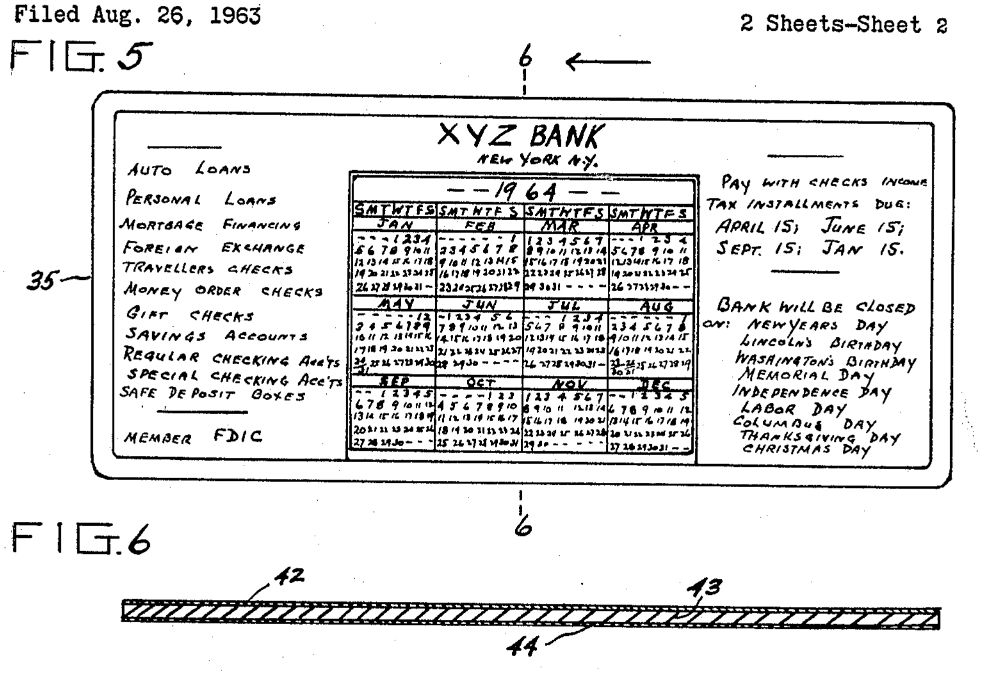
Figure 7:
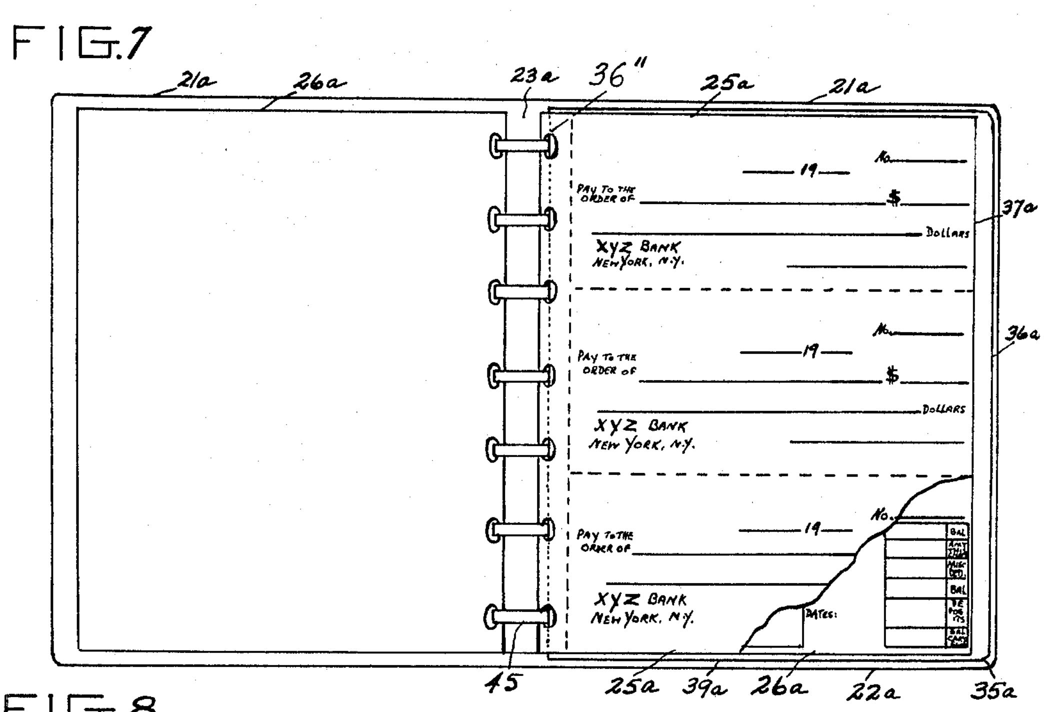
Figure 8:
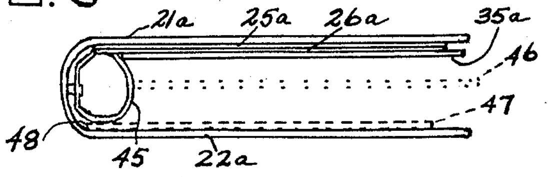

In the drawing: FIG. 1 is a top plan view of the check book open and a fragmentary view of a part; FIG. 2 is a view similar to FIG. 1 with the top or first check shown in FIG. 1 removed; FIG. 3 is a top plan view on a reduced scale of the check book with an unused check blank folded over to the left to expose the succeeding stub blank; FIG. 4 is an enlarged end view of the unbound end illustrating a relationship of parts with the book closed; FIG. 5 is a plan view of a part shown in FIGS. 1, 2, 3 and 4; FIG. 6 is a cross-sectional view of the part shown in FIG. 5, the section taken on the line 6—6 of FIG. 5; in FIG. 7 is a plan view of a modified form of check book with the book shown open and with part of a check blank broken away to show a stub part; FIG. 8 is a bottom end view on a reduced scale, disproportionate as to length and width relative to thickness, of the book shown in FIG. 7 in closed state illustrating relationships of parts.

The advent of the ball point pen together with the emphatic exhortations by banks for depositors to press firmly with the pen when making out carbon leaved deposit slips have helped to cause a tendency among present day depositors to bear down rather heavily on the paper when engaged in writing out a check. In the ordinary check books, this frequently results in relatively deep indentations in the succeeding check blank which frequently interfere with or impede clear, smooth writing in the indented areas when an ordinary, old-fashioned split point pen is used. In check books of the kind wherein matter written on check blanks is simultaneously duplicated on stub blanks, whether by means of carbon or pressure sensitive, chemically treated paper, matter written on one check may, undesirably, be simultaneously duplicated on the succeeding checks as well as on the intended stub. To prevent such occurrences, a plate hinged to the back of the book, or cover has been suggested for interposition between the leaves, as for example in the United States patent to T. G. Cooper, No. 323,276, issued July 28, 1885 wherein flexible, collapsible hinges are used to accommodate the plate to the decreasing thickness of the book. It has also been suggested commercially that in a three-to-a-page check book the bottom part of a cover be provided with a lateral extension to the right of the checks which is hingeable to fold over the end edges of the checks and can be inserted between the desired stub and check to serve as an impression-preventive means. These prior attempts have presented certain difficulties in handling the member for insertion and removal and presented certain limitations in function which, among other things, the present invention aims to correct and improve upon.

Referring more particularly to the drawing: The check books and parts thereof shown in FIGS. 1 to 6 inclusive comprises a cover member 20 having a top portion 21 and a bottom portion 22 foldable towards each other along the central regional part 23. The bottom portion has the well known slot receiving a tongue member secured at the rear of a filler member 24 to detachably position and hold the filler in the cover in the well known manner. The filler member 24 comprises an assembly of check blanks 25 superimposed upon stub blanks 26 in alternate arrangement, first a check, then a stub, then a check, then a stub and so on. The check blanks and stub blanks may be secured at their tab ends or edges by any suitable means; as herein shown they are held by staples 27, the tops and bottoms usually covered as shown in the well known manner, the checks being detachable from the stubs along a perforated line represented by line 28. As suggested in my referred to co-pending application, a carbon coating 29 is provided on the back of each check blank to reproduce or duplicate on the stub next behind the check whatever written matter on the check is selected for duplication which, preferably, in the present case, is the selected matter shown herein and which is generally similar to the matter selected in my referred to co-pending application. The carbonized area on the checks is in registration with and behind the areas of the checks shown by dotted outline 30 (see FIG. 1) and covers the areas on the stub blanks shown by dotted outline 31 (see FIG. 2). The check blanks and stub blanks have spaces in registration respectively for the number of the check, the date of the check, the name of the payee and the amount of the check to be written in numerals; preferably these are designated spaces. The carbon coating 28 is shown in a continuous area not by way of limitation but rather in order to show a minimum of dotted outline on the check and stub faces to avoid confusion with other lines thereon. In practice with the check format shown herein, it is contemplated that there will be no carbon coating to the right of the date line and between the numbers "102" and "$55-" and the indicia associated therewith; that is the carbonized area will have a U-shape at the right hand end of the check principally to save carbon since it is not desired to duplicate any matter between the duplicated matter shown in FIG. 2.

The stub blanks each have a column of boxes and the second box 33 from the top is in registration with the numeral receiving space on the checks after the dollar sign. All the boxes extend further to the left relatively than do the numeral spaces on the checks by a distance equal to the width of any one digit, preferably any two digits. Aside from the duplicating space box, the other boxed spaces are for the purpose of recording amounts as indicated by the indicia at the right-hand ends of the boxes. As in my referred to application, the amount brought forward may preferably be entered in the top boxed space 34 after the numeral amount of the check has been duplicated in space 33 and proper alignment of the digits brought forward effected with the amount in space 33 to facilitate subtraction of the check amount plus a miscellaneous deduction for check cost, say ten cents, from the balance brought forward, all as further described and claimed in my referred to co-pending application.

Interposed between the first stub blank and the second check blank and adapted for interposition successively between stub blanks and next-behind check blanks is a combined writing board, leaf locater, impression-preventive member 35 which may be made of any suitable material and be of any suitable shape or thickness, or be of any suitable relative size to filler or cover, but which is, as shown, preferably of plastic material in the form of a generally rectangular sheet, preferably resiliently flexible. As shown herein, member 35 is made of three ply vinyl sheeting, a well known sheeting made by the Emeloid Co., Hillside, New Jersey. The center layer 43 is of white color and opaque and may carry suitable printed matter; the outer layers 42 and 44 are of clear or transparent vinyl and provide protective layers of sheeting for the printed matter which may be on both sides of the white, opaque central layer. The heat lamination of the layers between polished plates, in manufacture, provides an extremely smooth surface on the transparent layers and one which will not become indented from pen pressure, the plate-polished smooth surface also providing a hard and smooth backing for the stub blank especially when the latter is written or recorded upon directly, as in this particular type of check book, and particularly when the stub blanks are of thinner paper than the check blanks; also, the polished surface facilitates the gliding thereon of the user's writing hand in instances where the sheet member 35 is adjusted downwardly in the book to project therefrom sufficiently from the bottom of the assembly to provide a hand rest margin for signature signing or making entries near the bottom of the page and which hand rest margin will be flexed over the edge of the assembly to an inclined position by the weight of the writing hand. The sheet 35 may be of any suitable thickness, but for this check book (FIGS. 1–6) a thickness of one-ten thousandth of an inch (.010) appears satisfactory and provides sufficient flexibility and resilience for use also in folding check books for carriage in ladies' pocketbooks and in which books the sheet may be folded in the same manner as and together with the checks, that is, the sheet may be folded together with the assembly flexed in a generally U-shape form 180 degrees or more for storage in a desk cubbyhole or in ladies folding check books the sheet member 35 can be flexed with the leaves converging towards each other, such books usually having snap fasteners for releasably holding the flexed book in a folded shape; or the sheet member may be flexed double on itself in the check book to fold back check or stub blanks for any desired purpose, such as view of or review of the markings thereon. This sheet is clean, durable, impervious to dampness and ordinary moisture or perspiring hands and can be handled an inestimable number of times and used repeatedly in book after book and outlast the cover a number of times and is very light in weight.

In the preferred form sheet 35 is made so that whenever it is inserted between leaves in the filler, or assembly of check and stub blanks, with its inner edge 36′ wedged in the tab ends of the blanks at the bound end of the assembly as close to the staples as reasonably possible, its outer end edge 36 will extend or project outwardly beyond the end edge 37 of the checks and filler and lie inwardly of the corresponding end edge 38 of the cover; also the side edges 39, 39, of sheet 35 will project outwardly of the side edges 40, 40 of the checks and filler and will lie inwardly of the side edges 41 of the cover 20. With this construction and relationship of parts, the edges of sheet 35 are shielded in transit or carriage by the cover and are available for seizure by the fingers to lift the stub blanks and fold them back to expose the succeeding check blank for use. Being right handed in writing, I find it very convenient to straddle the filler with thumb and middle fingers of the left hand to seize the side edges 39, 39 of the sheet 35 adjacent its end edge 36 and simultaneously use the forefinger of the same hand to engage end edge 36 to lift the used stub blanks all together with the sheet 35, using the sheet as a lifter, to fold the stub blanks out of the way to the left; then, sheet 35 is removed and reinserted between the next stub blank and the check blank behind it to prevent matter which will be duplicated on said next stub blank from being duplicated or appearing on the check blank next behind said stub blank. Since edge 37 is the free end edge of the checks (i.e. opposite the bound edges) it is advantageous that the corresponding edge 36 of the sheet 35 also be free for simultaneous lifting of leaves and sheet and to provide a projection which can be engaged by female fingers with long finger nails to lift the leaves, without danger to the nails, and to rapidly locate the check to be used. In some instances, it may be desirable to limit the width of the sheet to the width of the filler to fit a shipping box for the latter, for example. In some instances the assembly or filler may be held together by a tacky cement at the extreme end edges instead of by staples and in such instances the sheet 35 will be made long enough to extend to the very end edge of the inner or bound ends of the leaves and still project outwardly as shown herein. Sheet 35 is approximately one one-thousandth of an inch thicker than the combined thickness of one check blank and one stub blank.

Since sheet 35 is, preferably, detachable, it will be clear that, should any user feel that the projecting edge 39 at the bottom of the filler interferes with his writing hand, the sheet can be shifted or slid upwardly until the bottom side edge 39 is even or flush with the bottom of the filler or the sheet member may be shifted downwardly to provide the hand rest hereinbefore described.

Referring particularly to FIGS. 5 and 6, the printed matter shown in FIG. 5 is on the central layer 43 which layer is white and opaque and the printing is covered together with layer 43 by a layer of clear, transparent vinyl coating. Since these sheets 35 are very durable and, ordinarily, will outlast many fillers the other face of the sheet may have calendars for the years 1965 and 1966, for example, and any other pertinent or advertising matter printed on the white central layer covered with the vinyl coating layer. The use of such a sheet for the check book purpose combined with advertising and, if desired, pertinent information provides the economic appeal of pro-rating the sheet cost between the checking and advertising departments of a bank.

In the modification of check book shown in FIGS. 7 and 8, the check and stub blanks of the three-to-a-page filler are loosely bound together on ring 45 on the cover in a well known manner and sheet **35*a* is of sufficient size to be accommodated to the filler as hereinbefore described. The inner ends 36″ of sheet 35*a* extend substantially into engagement with the rings 45 whenever the sheet is between leaves of the filler, the rings serving to stop inward insertion of the sheet member 35*a* and the blanks on top of the sheet member tending to prevent the sheet member riding up on the rings. Because of the curvature of the rings, the sheet 35*a* will appear substantially as the solid line outline 35*a* shows it in FIG. 8 when beneath or behind the first stub blank, for example; at the approximate middle of the filler, it will engage the highest part of the curvature of the rings and, consequently, will extend slightly outwardly of the end edges of the cover as approximately shown by dotted outline 46 (all the leaves behind the first two have been omitted in FIG. 8 in order to more clearly show the positions of sheet 35***a*) and the further back in the book the sheet is inserted between leaves the further inward the sheet will rest until before the last two leaves it will occupy a position relative to filler and cover corresponding to the position of outline 35*a*; finally, when positioned for shipping, for example, adjacent and resting on the inside of the back cover as shown by dash outline 47, it can be more or less wedged under the rings with its inner end located approximately as indicated at 48. In this larger check book with its heavier leaves I have found that the sheet 35*a* may, satisfactorily, have a thickness of .010, .015 or .020, whichever is desired. In other respects, the book and parts shown in FIGS. 7 and 8 are similar to the book and parts shown in FIGS. 1 to 6 inclusive.

Although I have shown the invention embodied in a check book and its modification wherein the checks have a carbon coating on their backs for duplicating on the stub blanks matter written on the check blanks, I wish it to be understood that I am aware of the "NCR paper" made by the National Cash Register Co., which paper is chemically coated whereby if the coated surfaces of two pieces of the paper, for example a check and a stub, are positioned together with the coated surfaces facing each other writing on the uncoated surface of one will be duplicated on the coated surface of the other without the use of visible carbon between the pieces of paper; and, that I am also aware that the Minnesota Mining and Manufacturing Co. has developed a chemically treated paper called "Action paper" which will duplicate matter written on ordinary paper when both are together; consequently, if desired, either of these or similar papers may be used in the check book instead of the carbon coating on the checks and instead of the ordinary paper stub blanks to duplicate whatever written matter on the checks is desired.

The invention is susceptible of other embodiments all within the spirit and scope of the invention defined by the claims herein.

I claim:

1. In a manifolding check book comprising a plurality of superimposed check blanks and stub blanks alternately arranged in an assembly with a check blank and a stub blank constituting a pair of the blanks, and means in each pair of said blanks for duplicating on the stub blanks matter written on the check blanks: a slidably adjustable impression-preventive sheet member for insertion and removal between the blanks, the sheet member composed of resiliently flexible material for bodily arcuate folding in a generally U-shape form to provide an arcuate bend of at least 180 degrees.

2. In a manifolding check book comprising a plurality of superimposed check blanks and stub blanks alternately arranged in an assembly with a check blank and a stub blank constituting a pair of the blanks, the stub blanks having duplicating and recording spaces, and means in each pair of said blanks for duplicating on the stub blanks matter written on the check blanks: a slidably adjustable, detachable impression-preventive sheet member for insertion and removal between pairs of said blanks, said sheet member having its maximum thickness greater than the thickness of a check blank but a thickness not in excess of two hundredths of an inch and said sheet member being composed of resiliently flexible material for bodily arcuate folding in a generally U-shape form to provide an arcuate bend of at least 180 degrees.

References Cited by the Examiner

UNITED STATES PATENTS

| | | | |
|---|---|---|---|
| 778,273 | 12/1904 | Rosewater | 282—8.1 |
| 1,201,377 | 10/1916 | Staars | 282—9 |
| 2,603,909 | 11/1954 | Allan | 283—58 X |
| 3,115,351 | 12/1963 | Dazey | 282—22 |
| 3,147,928 | 9/1964 | Scully | 282—23 |

FOREIGN PATENTS

| | | |
|---|---|---|
| 321,236 | 9/1902 | France. |

LAWRENCE CHARLES, *Primary Examiner.*